(12) United States Patent
Allard et al.

(10) Patent No.: US 7,899,709 B2
(45) Date of Patent: Mar. 1, 2011

(54) SYSTEM AND METHOD FOR IDENTIFICATION AND TRACKING OF FOOD ITEMS

(75) Inventors: James C. Allard, Seattle, WA (US); Stephen D. Rosen, Seattle, WA (US)

(73) Assignee: Madison Holdings, Inc., Seattle, WA (US)

( * ) Notice: Subject to any disclaimer, the term of this patent is extended or adjusted under 35 U.S.C. 154(b) by 754 days.

(21) Appl. No.: 11/742,471

(22) Filed: Apr. 30, 2007

(65) Prior Publication Data
US 2008/0270324 A1 Oct. 30, 2008

(51) Int. Cl.
*G06Q 20/00* (2006.01)
*F27B 9/06* (2006.01)

(52) U.S. Cl. .......................... 705/23; 219/388
(58) Field of Classification Search ............ 705/28
See application file for complete search history.

(56) References Cited

U.S. PATENT DOCUMENTS

| | | | |
|---|---|---|---|
| 4,530,067 A | 7/1985 | Dorr | |
| 4,777,488 A | 10/1988 | Carlman, Jr. | |
| 4,919,950 A * | 4/1990 | Mak | 426/233 |
| 5,003,472 A | 3/1991 | Perrill | |
| 5,287,948 A * | 2/1994 | Casale et al. | 186/41 |
| 5,522,509 A * | 6/1996 | Shimamura et al. | 209/3.3 |
| 5,562,183 A * | 10/1996 | Naramura | 186/49 |
| 6,431,318 B1 * | 8/2002 | Tanaka | 186/49 |
| 6,581,727 B1 * | 6/2003 | Tokuno | 186/50 |
| 6,595,328 B1 * | 7/2003 | Ishino et al. | 186/49 |
| 6,937,922 B2 | 8/2005 | Shimizu | |
| 7,117,374 B2 | 10/2006 | Hill | |
| 7,156,303 B1 | 1/2007 | Holzman | |
| 7,185,809 B2 | 3/2007 | Barton | |
| 7,243,758 B2 * | 7/2007 | Ishino et al. | 186/49 |

(Continued)

FOREIGN PATENT DOCUMENTS

DE 29614652 U1 10/1997

(Continued)

OTHER PUBLICATIONS

International Search Report dated Jul. 1, 2008, issued in corresponding Application No. PCT/US2008/060873, filed Apr. 14, 2008.

*Primary Examiner* — Matthew S Gart
*Assistant Examiner* — Ashford Hayles
(74) *Attorney, Agent, or Firm* — Christensen O'Connor Johnson Kindness PLLC (57) ABSTRACT

A food identification and tracking system includes a plurality of containers adapted to hold food items. An electronically-readable tag is affixed to each of the containers. The data stored on the tags may include information, such as an identification of a food item being held by the container, the ingredients of the food item, and/or the price of the food item, for example. The containers may be distributed by way of a conveyor system offering the food items in the containers for consumption. One or more sensors positioned relative to the conveyor may electronically read the data stored on a tag and cause the identification of the food item in a container to be shown on a display. When the data in each tag includes an indicator of the price of the food item, the cost of all the food item(s) consumed by a consumer may be calculated for payment.

23 Claims, 5 Drawing Sheets

U.S. PATENT DOCUMENTS

| | | | | |
|---|---|---|---|---|
| 7,255,199 B2 * | 8/2007 | Ishiwata | | 186/49 |
| 7,679,510 B2 * | 3/2010 | Feldenzer | | 340/572.1 |
| 7,810,427 B2 * | 10/2010 | Ishino et al. | | 99/483 |
| 2002/0002493 A1 * | 1/2002 | Tanaka | | 705/15 |
| 2002/0088671 A1 * | 7/2002 | Tanaka | | 186/38 |
| 2002/0108506 A1 * | 8/2002 | Shimizu | | 99/486 |
| 2003/0038179 A1 * | 2/2003 | Tsikos et al. | | 235/454 |
| 2003/0182199 A1 * | 9/2003 | Kwang-Ii | | 705/26 |
| 2004/0103043 A1 | 5/2004 | Reade | | |
| 2004/0221723 A1 * | 11/2004 | Ishino et al. | | 99/275 |
| 2005/0051528 A1 * | 3/2005 | Chen | | 219/388 |
| 2006/0085266 A1 | 4/2006 | Wei | | |
| 2007/0012200 A1 | 1/2007 | Allard | | |

FOREIGN PATENT DOCUMENTS

| | | | |
|---|---|---|---|
| EP | 1125528 A2 | | 8/2001 |
| JP | 2001149206 A | * | 6/2001 |
| JP | 2004154346 | | 6/2004 |
| JP | 2004242693 | | 9/2004 |

* cited by examiner

SYSTEM AND METHOD FOR IDENTIFICATION AND TRACKING OF FOOD ITEMS

BACKGROUND

The present application is directed to methods and systems for identifying and tracking food items made available for consumption by consumers, e.g., as in a restaurant. In one implementation, methods and systems disclosed herein are used for managing the preparation and distribution of sushi in a kaiten sushi restaurant.

"Kaiten" is a Japanese word with an approximate English translation meaning "turns". It relates to the "turning" of a conveyor belt in the kaiten sushi dining experience. Kaiten sushi restaurants were first invented in the late 1950's in Japan where they created a new category of quick service sushi dining. In kaiten sushi restaurants, a conveyor belt winds its way around the restaurant, at some point closing the circle back onto itself. Typically, sushi chefs stand inside the belt and prepare assorted sushi and related dishes, which they then put on small color-coded plates that are subsequently placed on the conveyor belt. The color coding relates to the price of the item on the plate. For example, sushi items on a green plate may cost $1.00, while sushi items on a yellow plate may cost $1.50 or on a light blue plate may cost $2.00, and so on. These plates then travel around the circuit of the conveyor belt, full of sushi choices for the restaurant customers. Customers watch the plates go by and choose the ones they wish, taking the plates off the belt and thereby leaving an empty spot on the conveyor for the sushi chef to quickly fill with another plate of sushi.

At the end of a meal, a customer has a stack of individual plates that are subsequently tallied by a waiter/server (e.g., five green plates@1.00+three yellow plates@$1.50=$9.50) and a bill is generated for the customer. Conveyor belt sushi has proven to be an innovative way of dining that has gained significant popularity in Japan and is now making its way to the United States.

There are a number of operational challenges in a kaiten sushi environment. For example, an important part of a kaiten sushi operation is identifying for the customer the type of sushi that is sitting on each individual plate that passes before them. To date, such forms of identification have been static, including either a structural ring system as found in U.S. patent application Ser. No. 11/485,843 (assigned to the assignee of the present application), a flag identifier as found in U.S. Pat. No. 6,937,922, or identification stickers placed on the plates. What is needed is a method and system that dynamically shows customers what is on a particular sushi plate as it passes by on the conveyor belt.

At the end of a customer's meal, a server must tally up the plates of different colors and calculate the total bill for the customer. Frequently, a server will erroneously miscount the number of plates of a specific color (e.g., counting four green plates instead of five green plates, or counting three blue plates instead of two blue plates). This results in an incorrect tally of the overall bill to the customer. What is needed is a method and system that improves and automates the tallying of plates for calculating the customer's bill in a quick, accurate, and efficient manner.

The present application addresses these needs as well as other shortcomings in existing food identification and distribution systems, as for example used in a kaiten sushi restaurant.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Disclosed herein are various aspects of a food identification and tracking system constructed in accordance with the present invention. In one implementation, the system includes a plurality of containers, wherein each container is adapted to hold a food item. For example, as will be discussed below, a plurality of plates may be distributed to consumers by way of a conveyor system with food items placed on the plates. A plate is just one form of a container in the context of the present application.

The system further includes a plurality of identification tags, wherein each tag is affixed to one of the plurality of containers. The tags each have electronically-readable data stored thereon for identifying a food item being held by the respective container.

A conveyor is configured to convey the plurality of containers in a loop around a space, such as in a kaiten sushi restaurant. The containers are placed on the conveyor by the operator of the food identification and tracking system to offer the food items in the containers for consumption.

Lastly, one or more sensors are configured to electronically read the data stored on the tag of a container that is brought into proximity of the sensor. A display in communication with the sensor receives the identification of a food item in a container that has been brought into proximity of the sensor. The display thereafter displays the identification of the food item to consumers while the container is in proximity to the display. Consumers can select the food items they wish to consume by removing the containers from the conveyor as the food items pass by in front of them.

In another implementation, described herein is a food identification and tracking system comprising a plurality of containers, a sensor, and a processor associated with the sensor. As with the implementations discussed above, the containers each have an identification tag affixed thereto containing electronically-readable data. In this implementation, the data includes an indicator of the price of a food item placed in the container to which the tag is affixed. The food item is placed in the container for consumption on the premises of the operator of the food identification and tracking system.

Consumers select which food items they wish to eat and take the containers to a location on the premises where the food items are consumed. When a consumer has finished his or her meal, the sensor is used to tally the cost of all the food items consumed. More specifically, the sensor is configured to read the data stored in the tags of containers from which the consumer has consumed the food items. The data is communicated from the sensor to its associated processor. The processor is configured to receive the price of the food item and automatically calculate the total cost of the food item for payment by the consumer.

While the present application describes implementations of the system in a kaiten sushi restaurant, it should be understood that the system may be used in a wide variety of contexts in which food items are made available for selection and consumption by consumers.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
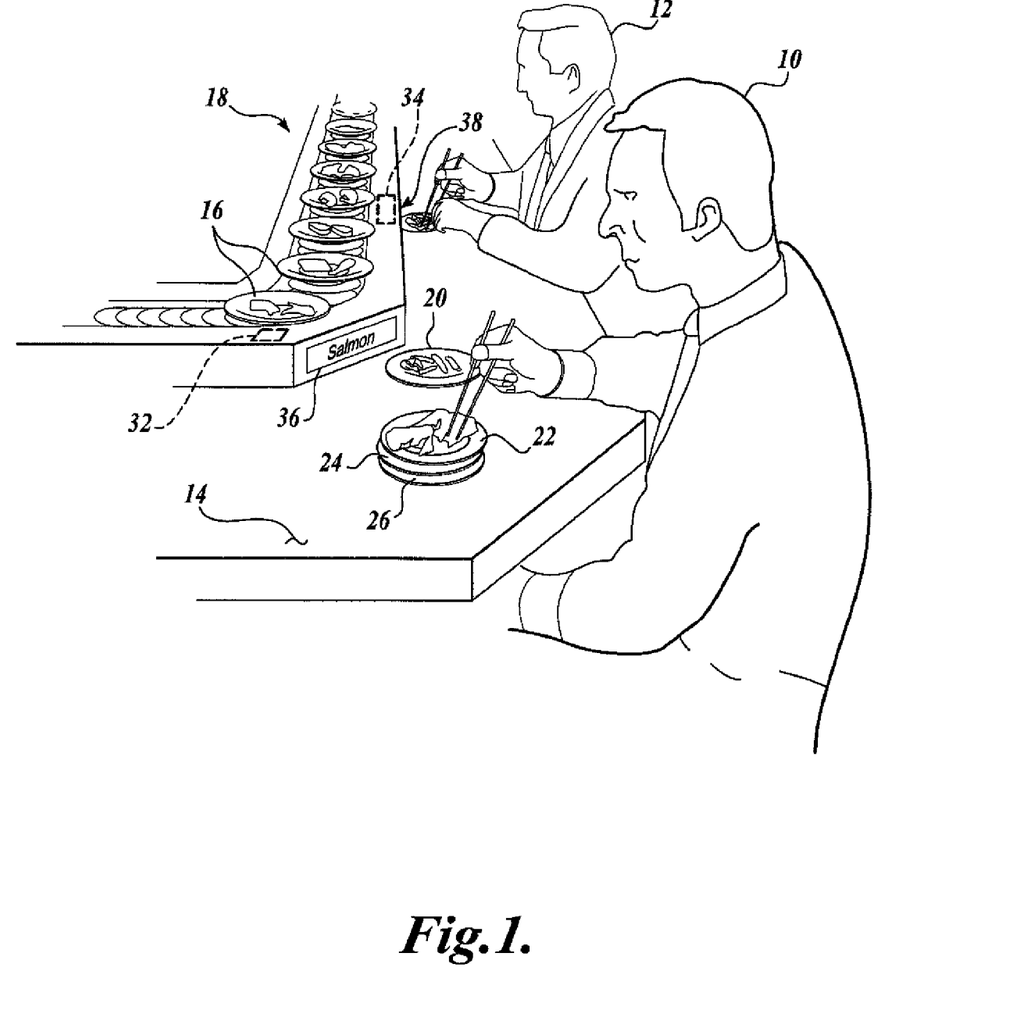
FIG. 1 is an environmental view of a kaiten sushi restaurant using a method and system as disclosed in the present application.

FIG. 1 provides an environmental view of a restaurant using one example of a method and system as disclosed in the present application. In this particular, non-limiting example, the restaurant is a kaiten sushi restaurant. Consumers 10 and 12 sit at a counter 14 as plates 16 containing various food items, such as sushi, pass by on a conveyor belt system 18. When a consumer 10, 12 desires a particular food item, the consumer 10, 12 removes the plate 16 containing the food item from the conveyor belt system 18, for example as shown by plates 20, 22. If desired, each plate may be color coded to represent the price of the food item on the plate. When the consumer 10, 12 finishes consuming various food items, the consumer retains the empty plates, for example as shown by plates 24, 26. At the end of the consumer's meal, the cost of the food items consumed is tallied from the empty plates and a total cost is presented to the consumer for payment.

For purposes of illustration only, this implementation depicts the consumers 10, 12 sitting at a counter 14. In other implementations, consumers 10, 12 may sit at various tables or booths where they can consume the food items they have removed from the conveyor belt system 18. In a booth environment, the conveyor belt system 18 may be located so it is accessible by a consumer sitting at one end of the booth. It should be appreciated that any seating arrangement is possible, so long at food items are visible to the members of a dining party and at least one member of the dining party can access the conveyor belt system 18 to remove desired food items.

Figure 2:
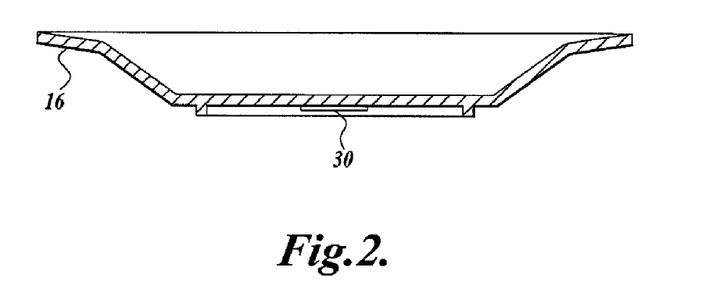
FIG. 2 is a side cross-sectional view of a container, namely a plate, having an identification tag affixed thereto.

In accordance with a further aspect, each of the plates 16 (as well as the plates 20, 22, 24, 26) shown in FIG. 1 have an identification tag 30 affixed thereto, an example of which is illustrated in FIG. 2. Typically, the identification tags 30 are affixed to the bottom or a side of the plates 16 so as to be unobtrusive and generally unseen in the course of serving food items to the consumers 10, 12. Preferably, the tags are permanently affixed to the plates, such that the tags can withstand daily use of the plates in a restaurant where the plates are subjected to regular cycles of washing in hot water. In one particular implementation, an adhesive known as 7871 coater manufactured by 3M has been found to be suitable for this purpose.

The identification tags 30 each have electronically-readable data stored thereon for identifying food items being held by the respective plates 16 to which the tags are affixed. While optical reading technologies may suitably be used to electronically read data from the tags, the implementation shown in FIG. 1 as well as the remainder of this application uses radio frequency communication to electronically read the data stored on the tags. In more recent time, tags known as radio frequency identification (RFID) tags have been developed for a wide variety of applications in which data is stored and wirelessly communicated by the tags.

RFID tags typically have an antenna, a memory, and some form of processing circuitry that is configured to receive an interrogating signal from a sensor and transmit a reply signal bearing data stored in the memory. Some RFID tags are active in nature, meaning the tags have an energy storage, such as a battery, within the tag to power the components of the tag for communicating the data stored in the tag. Other RFID tags are passive in nature in that they do not have an energy storage in the tag. Passive RFID tags are configured to receive energy from incoming interrogation signals and use the energy of the incoming signals to produce an outgoing reply signal bearing the data stored in the memory of the tag. Both active and passive tags may be used in connection with implementations of the present invention. One example of a tag that has been found suitable for use is an IF5 tag with a near-field UHF antenna manufactured by Intermec. The term near-field indicates that the tags are specifically designed to operate at close range. Sensors in corresponding IF5 readers are calibrated so they only receive signals from tags on plates in their immediate vicinity. This helps avoid false data from tags on nearby plates.

FIG. 1 further depicts sensors 32, 34 which are configured to electronically read the data stored on the tag 30 of a plate 16 that is brought into proximity of the sensors 32, 34. In this particular implementation, multiple sensors 32, 34 are shown generally spaced along the conveyor belt system 18. The sensors are generally located where consumers sit to consume sushi that has been placed on the plates 16. In other implementations, fewer or greater numbers of sensors 32, 34 may be used to track the plates 16 and the food items being carried by the plates.

A display 36 in communication with the sensor 32 receives the identification of a food item on a plate 16 that has been brought into proximity of the sensor. The display 36 thereafter displays the identification of the food item to the consumer 10 while the plate 16 is in proximity to the display 36. In the example shown in FIG. 1, the plate 16 is holding a sushi item comprising salmon, as shown by the display 36. Furthermore, the example shown in FIG. 1 depicts the sensor 32 at a location separate from the display 36. In other embodiments, the sensor 32 may be integrated with the display 36. In either case, the sensor 32 is positioned relative to the display 36 so that the identification of the food item is properly timed for display while the plate 16 is in proximity to the display 36.

The conveyor belt system 18 is configured to bring each of the plates 16 into proximity of the sensor 32 and the display 36, so the consumer 10 can consider the food items and select the food items he or she wishes to consume. As noted earlier, when the consumer 10 desires to consume a food item, the consumer removes the plate 16 from the conveyor, as shown by plates 20, 22. The consumer 10 consumes the food item while remaining on the premises of the operator of the food identification and tracking system shown in FIG. 1. If desired, after the consumer has consumed the food item(s) and the consumer's final bill has been tallied, the plates 16, 20, 22, 24, 26 may be washed and reused to provide another food item to another consumer.

In similar fashion, the sensor 34 in FIG. 1 is configured to read the tags 30 of plates 16 brought into proximity of the sensor 34. The identification of a food item obtained from reading the tag 30 of a plate 16 is displayed on a display 38 to the consumer 12. Like the consumer 10, the consumer 12 can view the identification of the various food items on the plates 16 as the plates are carried by the conveyor belt 18 into proximity of the sensor 34 and the display 38.

It should be understood that FIG. 1 depicts only one example of an environment in which the principles of the present invention may be implemented. In other environments, for example, the configuration, placement, and/or operation of the conveyor belt 18, the sensors 32, 34, the tags 30 and/or the displays 36, 38 may be different and still achieve the benefits and advantages of the present invention. As to the displays 36, 38, for instance, it may be desirable to provide displays that are a few feet in length and several inches in height, arrayed throughout the restaurant just behind and above the conveyor 18. The identification of the food item (and possibly other information such as price, ingredients, etc.), shown on the displays 36, 38 may scroll along the screen at the same speed as the plate 16 moving below it on the conveyor 18, until the plate reaches the end of the display, at which point later along the conveyor, another sensor 32, 34 would obtain the information from the tag 30 and display the information as described on another display. As may be appreciated, any shape and size of display may be used.

Figure 3:
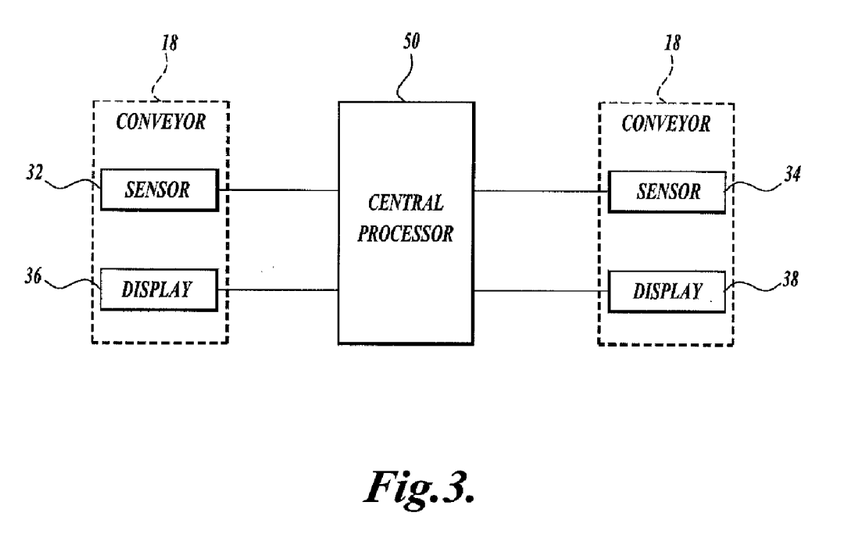
FIG. 3 is a block diagram of a food identification and tracking system including a conveyor with sensors and displays arranged to read and display data from identification tags affixed to containers traveling on the conveyor.

FIG. 3 is a block diagram of a food identification and tracking system as shown in FIGS. 1 and 2, wherein the system includes the sensors 32, 34 and displays 36, 38 arranged with the conveyor 18. The sensors are capable of reading data from the identification tags 30 affixed to containers, such as plates 16, that are on the conveyor 18. Though not required, the sensors 32, 34 and displays 36, 38 may be communicatively connect to a central processor 50. The central processor 50 may be configured to use the identification data read from tags 30 by the sensors 32, 34 to track the consumption of food items on plates 16 taken from the conveyor 18. The central processor 50 may also be configured to manage the time in which plates 16 with food items may remain on the conveyor 18 and well as direct the preparation of additional food items to replace food items removed from the conveyor 18.

Such management of food inventories and preparation of food items is improved where the tag 30 on a plate 16 further includes data that, within the system, uniquely identifies the plate 16 to which the tag 30 is affixed. If the tag on a particular plate 16 known to have been on the conveyor 18 is no longer being read by the sensors 32, 34, the system may assume the particular plate 16 has been removed from the conveyor 18, either for consumption or for disposal. As will be noted later herein, if a plate 16 holding a food item has been on the conveyor 18 too long without being removed for consumption, the system may notify the operator of the system to remove the particular food item from the conveyor 18. Alternatively, or in addition, an automated mechanism, such as an actuated arm connected to the conveyor 18, may be used to automatically remove particular plates 16 with food items known to have been on the conveyor 18 for too long. Unique identification codes assigned to each of the plates 16 also helps identify the particular plates that have been removed by consumers for consumption. This is beneficial for tracking the kinds of food items in demand, which may drive inventory purchasing and focused preparation of the food items being consumed.

If desired, the display 36 may be configured to display the identification of a food item for a period of time that is longer than the time in which the plate 16 holding the food item is in proximity to the sensor 32. Likewise, the display 38 may be configured to display the identification of a food item for a period of time that is longer than the time in which the plate 16 is in proximity to the sensor 34. In another aspect, the displays 36, 38 may be configured to scroll the identification of the food item at a rate that matches the movement of the plate 16 on the conveyor 18.

The tag 30 on a plate 16 may be further configured to hold data that identifies one or more ingredients of the food item on the plate 16. In that circumstance, the displays 36, 38 may be configured to receive and display the ingredient(s) along with the identification of the food item. A multi-line display may be used for this purpose. Alternatively, or in addition, the identification of the food item and the ingredient(s) may be scrolled on the displays 36, 38 to ensure the information is available to the consumers 10, 12.

In another implementation, the tag affixed to a container may include price data relative to the food item placed in the container. The price data may be automatically retrieved and processed for calculating a total cost for payment by the consumer of the food item. An illustration of this implementation is shown in the block diagram in FIG. 4. A sensor 60 is shown with an associated processor 62. The sensor 60 is capable of wirelessly communicating with tags 64 affixed to containers 66. The sensor 60 may also be configured to communicate wirelessly with its associated processor 62, depending on the configuration of the system. For purposes of this implementation, it is assumed that the food items in the containers 66 have been consumed by a consumer.

Figure 4:
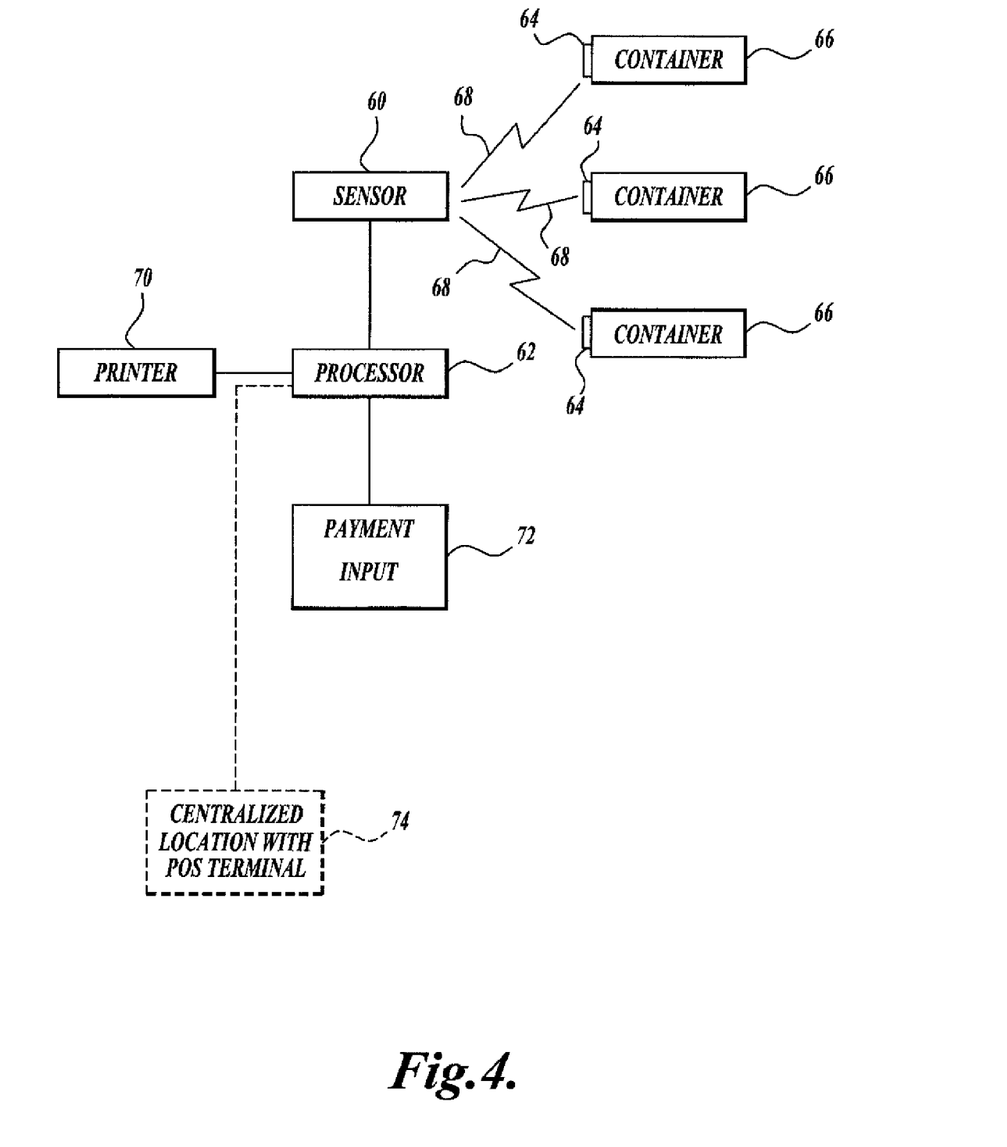
FIG. 4 is a block diagram of a portable sensor and associated processor for reading identification tags of containers from which food items have been consumed, allowing a tallying of the cost of the food items.

The sensor 60 transmits an interrogation signal 68 that is received by the tags 64 that are located within an area that is proximate to the sensor. An advantage of a wireless system as featured in FIG. 4 is that the sensor 60 can read the electronically-readable data of the tags 64 without requiring movement of the containers 66 to read the data. Where the data includes the prices of the food items consumed, the sensor 60 is able to communicate the prices to the processor 62 for calculation of a total bill.

In one embodiment, the sensor 60 is portable and can be selectively brought to a location within the premises where the consumer has consumed the food item(s). An example of this is a portable sensor that a restaurant employee can wave or hold over the plate(s) of a consumer who has finished eating. The associated processor 62 receives the price information from the portable sensor and determines the total cost. The associated processor 62 may further communicate with a printer 70 for printing a bill and/or receipt. Communication with the printer 70 may be wired or wireless. If desired, the printer 70 may be integrated with the portable sensor to enable the restaurant employee to deliver the printed bill to the consumer at the same time the sensor 60 is waved or held over the consumer's finished plates.

The associated processor 62 may communicate with a payment input 72. Preferably, the payment input 72 is integrated with the portable sensor 60, though such is not required. An integrated configuration enables the restaurant employee to receive payment from the consumer and, if connected to the printer 70, deliver a printed receipt to the consumer. The payment input 72 may, for example, be a keypad or magnetic strip reader that enables the restaurant employee to input credit card information of the consumer. The processor 62 thereafter communicates the credit card information and total charge to a credit card processing system (not shown) to complete the payment of the bill.

Alternatively or in addition, as shown in dashed line in FIG. 4, the processor 62 may automatically communicate with a centralized location 74 on the premises where a point-of-sale (POS) terminal is located. The processor 62 may be configured to forward an identification of the consumer and either the prices of the food items consumed (as obtained from interrogating the tags 64) or the total calculated charge, to the centralized location 74. The consumer may thereafter be directed to the centralized location 74 to effect payment for the food items by presenting cash or credit information at the POS terminal.

As is evident in FIG. 4, the sensor 60 is able to communicate with a plurality of tags on a plurality of containers. Communication protocols are well known in the art to individually interrogate the tags 64 or to collectively interrogate the tags 64. If the latter, known protocols are able to handle the contention that may arise if more than one tag 64 attempts to simultaneously communicate with the sensor 60. In some cases, certain tags 64 may be configured to wait certain periods of time before communicating to lessen the prospect that all of the tags 64 will attempt to simultaneously communicate with the sensor 60.

When communicating with a plurality of tags as described, the sensor 60 is able to gather the price data stored in the tags 64. The associated processor 62 is thereafter configured to receive the plurality of prices and automatically calculate the total cost for payment for all the food items consumed by the consumer.

In yet another embodiment, the system may include multiple sensors 60 and associated processors 62, wherein each sensor 60 and associated processor 62 are positioned at different locations within the premises where consumers consume the food items. For example, a sensor 60 and associated processor 62 may be positioned at each table or booth where consumers eat the food items they have selected. Advantageously, the sensor 60 may be configured to be operated by a consumer to read the tags 64 of the containers 66 from which they have eaten the food items and calculate the total cost of the food items for payment. In this "self checkout" embodiment, the associated processor 62 may include a printer 70 and/or payment input 72 as previously described. Where the associated processor 62 has a payment input, the processor may be configured to receive a payment from the consumer for the food items consumed. For example, the consumer may use a keypad to input credit card information to effect payment for the food items. A magnetic strip reader may also be provided.

As noted earlier, a kaiten sushi restaurant is just one example of an environment in which the food identification and tracking system described herein may be implemented. A unique feature of a kaiten sushi restaurant is that the food item (e.g., a sushi item) is prepared by the operator of food identification and tracking system and placed in the container without a consumer's specific request for the food item. As will be further discussed below, preparing food items in such a manner provides consumers the ability to immediately select and consume a food item that they see. On the other hand, there is a risk that the food item will not be consumed and after a defined period of time, the food item will have to be removed from the conveyor, resulting in waste. Implementations of the invention as discussed herein are better able to manage this risk.

Figure 5:
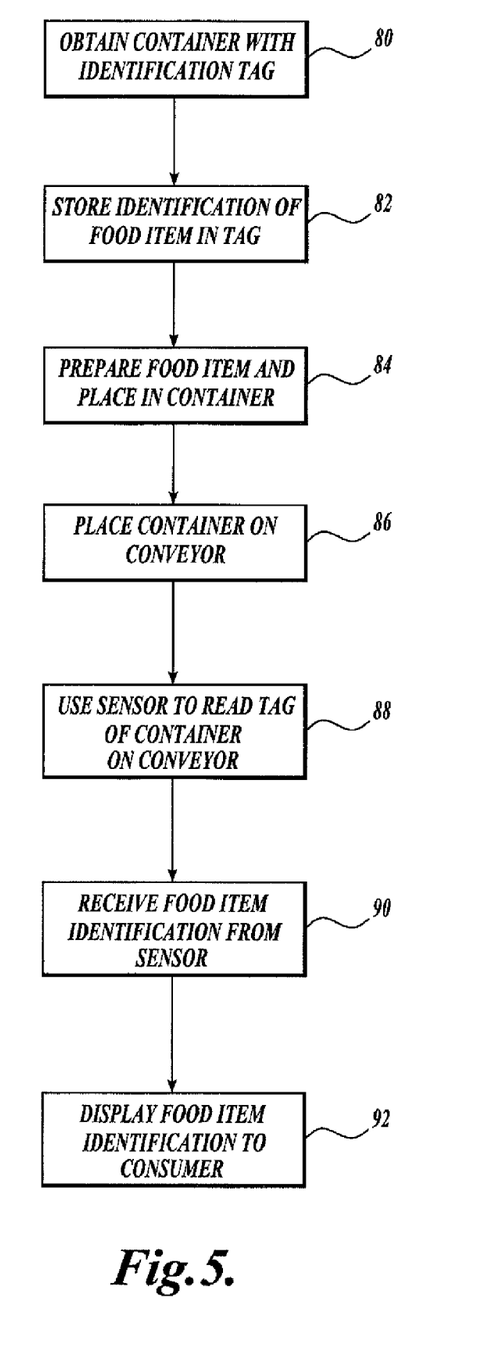
FIG. 5 is a flow diagram of a method of storing and reading data from a tag on a container which allows a display of an identification of a food item placed in the container.

Referring now to FIG. 5, a method for identifying and tracking food items begins at block 80, where the method comprises obtaining a container that is adapted to hold a food item. The container has an identification tag affixed thereto. As with the system implementations described above, the tag has a memory for storing electronically-readable data that identifies a food item placed in the container.

As part of preparing a food item and placing the food item into a container, it may be necessary to communicate with the tag to store an identification of the food item to be placed in the container. This is particularly the case in embodiments where the container is resuable and different food items can be placed in the container at different times. In embodiments where the tag is an RFID tag, a chef or other person involved in the preparation of food items may use a suitable interrogator/reader known in the art to communicate the identification of a food item to a tag for storage in the tag's memory, as indicated at block 82.

At block 84, the food item is prepared and placed in the container with the programmed tag. In some circumstances, as in a kaiten sushi environment, the food item may be prepared and placed in the container without receiving beforehand a specific request by a consumer of the food item. The container with the tag is thereafter placed on a conveyor, such as the conveyor belt system 18 shown in FIG. 1.

At block 86, the container is placed on a conveyor that conveys the container in a loop around a space. Typically, the conveyor is configured so that a consumer can view the food item in the container. If desired, the consumer removes the container from the conveyor to consume the food item while remaining on the premises where the conveyor is located.

To provide a wide variety of choice of food items, multiple containers with different food items may be placed on the conveyor. The conveyor conveys the containers around the loop. As shown in FIG. 1, one or more sensors 32, 34 are positioned at one or more locations along the conveyor. The sensor is used to electronically read the data stored in the tag of a container that is brought by the conveyor into proximity of the sensor, as indicated in block 88.

At block 90, the identification of the food item is received from the sensor and is provided to a display. The identification of the food item is thereafter displayed to consumers, as indicated at block 92, preferably while the container is in proximity to the display.

In some embodiments, it may be advantageous to display the identification of the food item by scrolling the text and/or graphics identifying the food item within the display at a rate that matches the movement of the container on the conveyor. In such embodiments, scrolling the identification of the food item may help consumers to visually target the displayed identification to the particular container on the conveyor.

As noted earlier, the tag may further include data identifying one or more ingredients of the food item in the container. In such embodiments, the method may further comprise receiving and displaying the ingredients along with the identification of the food item. After a consumer has selected a container from the conveyor and consumed a food item, the container may be returned for the operator for cleaning. The container may thereafter be used again to provide another food item to another consumer.

In some embodiments, the tag further includes data that uniquely identifies the container within the system, which can be used for tracking the location and use of the container as well as the consumption of food items in the container.

It should be understood from the foregoing that the actions shown in FIG. 5 may be performed in a different order than shown and still achieve the benefits and advantages of the invention. For instance, the chef or other person involved in the preparation of food items may first prepare the food items and place them in containers, and then program the identification of the food items into the tags of the respective containers (effectively performing the actions of blocks 82 and 84 in reverse order). Other modifications of the order of actions, as well as insertion of other actions between the steps shown, are still contemplated within the present disclosure.

Figure 6:
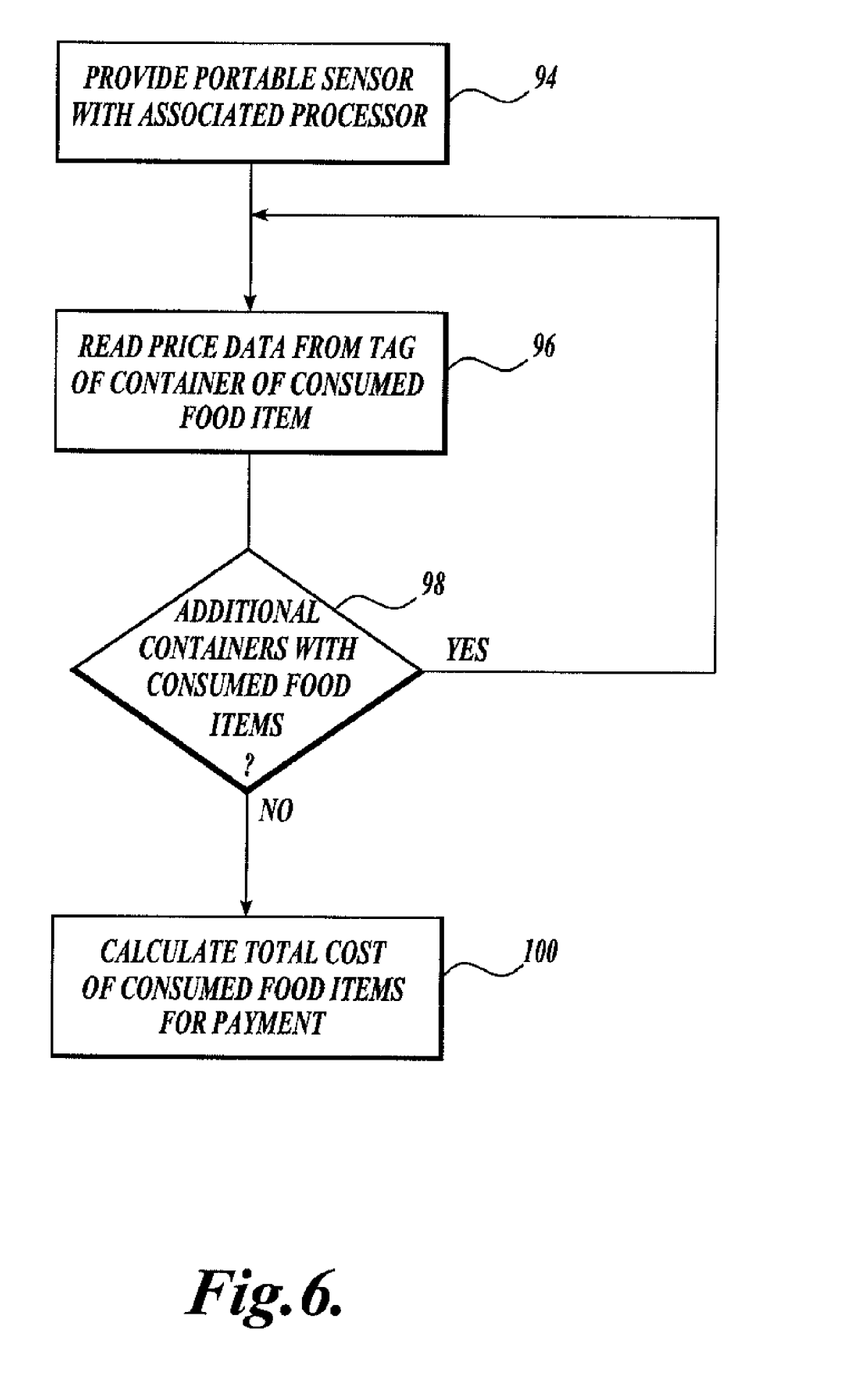
FIG. 6 is a flow diagram of a method of reading data from one or more tags for calculating the total cost of food items consumed from the containers to which the tags are affixed.

Referring now to FIG. 6, an additional method is provided for tallying the cost of consumed food items for payment by the consumer of the food items. The memory in the tag may further include data that identifies a price of the food item placed in the container.

As indicated at block 94, the method initially comprises the step of providing a portable sensor that can read the data stored in a tag. The portable sensor is used to read the data of a container from which a consumer has consumed the food item. In a specific implementation discussed earlier, a restaurant employee may carrying a portable sensor may hold or wave the sensor over a stack of plates from which a consumer has consumed the food items.

The price data for a food item is read from a tag in the stack of plates. At decision block 98, the portable sensor determines whether other containers with tags remain in proximity to the sensor from which the price data has not been read. If so, the reading process is repeated until all of the tags have been read. This process of reading the tags of each of the containers allows the portable sensor to eventually read all the data of all the tags, for example, in a consumer's stack of plates. The portable sensor thereafter is able to calculate a total cost for payment by the consumer, as indicated at block 100. In some circumstances, the portable sensor may communicate the prices read from multiple containers to a centralized location on the premises where the consumer can provide payment for the food items consumed, e.g., as discussed earlier with respect to FIG. 4.

As noted earlier, the tags on the containers may include a variety of information. In addition to price data, as discussed above, the tags may further include data such as an identification of the food item, the ingredients of the food items, etc. Where the tags include data such as an identification of the food item, the invoice or receipt provided to the consumer, as discussed above, may list the items consumed by name as well as price.

To help further illustrate a specific embodiment of the invention, the following description provides additional detail as to a work flow process that may be used when implementing the invention in a kaiten sushi restaurant. In this embodiment, RFID tags are used to store data related to sushi items placed on a plate.

At the initial introduction of the RFID system to the restaurant environment, an RFID tag is permanently affixed to the underside of each individual plate. Thereafter, each RFID tag is initially commissioned and assigned a dollar value wherein the price stored in the RFID tag matches the plate's price as listed in the menu according to the color of the plate. For example, the tag on each green plate is commissioned to a database with a value of $1.50. The tag on each yellow plate is commissioned to the database with a value of $2.25, etc. The association between these tags and the specific dollar values remains static and does not change unless the restaurant chooses to change the menu price for a green plate or yellow plate or any other color plate that has an associated value.

In operation of the restaurant, each sushi chef may have one or more RFID readers which reside in or around his/her work station. Each sushi chef may also have a touch screen monitor at his/her work station that is networked to the RFID reader at that particular station. When the sushi chef chooses to make a particular item (for purposes of discussion, a California roll), he takes a group of the appropriate color plates and passes them over the RFID antenna at his station, which captures the RFID tag identifiers. The sushi chef then touches the appropriate "California Roll" button on his touch screen, thereby automatically associating the just-read RFID tag identifier with the specific California Roll item. At this point in the process, the database has captured both the value of the plate (due to the original commissioning), the specific item on the plate, and the time at which that specific plate of sushi was made.

The sushi chef then makes the California rolls and places the pieces on the just-associated plates. He then places the plates at various spots of his choosing around the conveyor belt where they begin to pass in front of consumers.

RFID readers placed at strategic places around the conveyor belt thereafter pick up a signal from the tag on each plate as the plate passes by the RFID readers. The RFID readers transmit the information back to the main database. If desired, the software may then calculate how long that particular California roll has been on the conveyor belt. When the California roll is both approaching and has exceeded the time-on-the belt permitted by local health regulations, a message is transmitted to the sushi chef. The expired California roll is removed from the conveyor and discarded.

With each plate now having a commissioned value and an associated sushi item recorded in the database, and with RFID readers strategically placed around the belt, the RFID system can capture and provide critical business data such as:

Time of make;
Time of removal from belt;
Amount of time spent on the belt;
# of same-type items on the belt at any given moment;
# of variety of items on the belt at any given moment;
Sales value of all items made during any specified time period (hour, day, week, month, etc.);
Percent of conveyor belt full at any given time of day; and
Actual aggregate food cost of all items made during a particular period (hour, day, week, month, etc.), where the food cost per specific item has previously been written to the database.

Various displays, such as LED or LCD screens, are placed strategically around the conveyor belt, preferably at a slightly raised height that makes them easily visible to and readable by consumers. RFID readers/sensors are placed at the beginning of each run of an LED/LCD screen. These readers receive a signal from the RFID tag on each plate as it passes by the readers and transmit the specific plate information to the screen for display. Then, as the plate passes along the length of the screen, text scrolls on the screen at the same speed as the plate. The text displays plate identification information such as the "name" and "ingredients" of the sushi item. The scrolling information and associated plate of sushi enter the LED/LCD field at the same time, scroll on the screen and travel on the belt simultaneously and at the same speed, and exit the field at the same time.

At some point, the California roll plate of sushi is removed from the belt, either by a consumer dining in the restaurant or by a sushi chef if the chef receives notification on his monitor that the particular plate has exceeded the amount of time it is permitted to remain on the conveyor belt.

Upon completion of the meal, the consumer requests a server to tally up the total number of different plates to determine the full amount of the bill. The server utilizes an RFID reader to read the price information in the RFID tags on each plate and automatically tally the total number of each colored plate. This information is then transmitted wirelessly as price data to either a point-of-sale system or to a handheld printer in order to generate a paper bill and receipt for the customer.

While various implementations and embodiments have been illustrated and described, it will be appreciated that various changes can be made therein without departing from the spirit and scope of the invention. Moreover, features discussed above in the various implementations and embodiments may be used singly or in combination to achieve the advantages of the invention. The scope of the invention should not be determined from the precise forms disclosed above but from the claims that follow and equivalents thereto.

The embodiments of the invention in which an exclusive property or privilege is claimed are defined as follows:

1. A food identification and tracking system, comprising:
a plurality of containers, each container being adapted to hold a food item;
a plurality of identification tags, each tag being affixed to one of the plurality of containers and having electronically-readable data stored thereon for identifying a food item being held by the respective container;
a sensor configured to electronically read the data stored on the tag of a container that is brought into proximity of the sensor;
an electronic display in communication with the sensor to receive the data identifying a food item in a container that has been brought into proximity of the sensor and to electronically display the identification of the food item to consumers while the container is in proximity to the display; and
a conveyor configured to convey the plurality of containers in a loop around a space, wherein the containers are placed on the conveyor by the operator of the food identification and tracking system to offer the food items in the containers for consumption, and wherein the conveyor is configured to bring each of the containers into proximity of the sensor and the display,
wherein the electronic display is a stationary display separate from the conveyor and, as a container on the conveyor passes along a length of the display, the display is configured to electronically scroll the identification of the food item in the container simultaneously along the length of the display at a rate that matches the movement of the container on the conveyor.

2. The system of claim 1, wherein the conveyor is further configured to allow a consumer to remove a container from the conveyor for consumption of the food item in the container while on the premises of the operator of the food identification and tracking system.

3. The system of claim 2, wherein after consumption of the food item, the container is further configured for reuse by the operator to provide another food item to another consumer.

4. The system of claim 1, wherein the tag further includes data that, within the system, uniquely identifies the container to which the tag is affixed for tracking the consumption of the food item being held by the container.

5. The system of claim 1, wherein the display is configured to display the identification of the food item for a period of time that is longer than the time in which the container is in proximity to the sensor.

6. The system of claim 1, wherein the tag further includes data for identifying one or more ingredients of the food item in the container to which the tag is affixed, and wherein the display is configured to receive and display the ingredients along with the identification of the food item.

7. The system of claim 1, wherein the electronically-readable data includes an indicator of a price of the food item;
the system further comprising a sensor configured to read the electronically-readable data stored on a tag of a container from which a consumer has consumed the food item; and
a processor associated with the sensor, wherein the processor is configured to receive the price of a food item in a container whose tag has been read by the sensor and to automatically calculate a total cost for payment by the consumer of the food item.

8. The system of claim 7, wherein the food item in a container is prepared by the operator of the food identification and tracking system and placed in the container without specific request by a consumer of the food item.

9. The system of claim 7, wherein the processor is configured to receive a plurality of prices from a plurality of containers whose tags have been read by the sensor and to automatically calculate the total cost for payment for all the food items consumed by the consumer.

10. The system of claim 7, wherein the sensor is configured to read the electronically-readable data of tags on a plurality of containers located within an area that is proximate to the sensor without requiring movement of the containers to read the data.

11. The system of claim 7, wherein the sensor is portable and can be selectively brought to a location within the premises of the operator where the consumer has consumed the food item.

12. The system of claim 7, further comprising multiple sensors and associated processors, wherein each sensor and associated processor are positioned at different locations within the premises of the operator where consumers consume food items, and wherein each sensor is configured to be operable by a consumer to calculate the total cost for payment.

13. The system of claim 12, wherein the processors are further configured to receive a payment from the consumer for the food items consumed.

14. The system of claim 7, wherein the processor is further configured to automatically communicate the total cost to a centralized location in the premises where the consumer can provide payment for the food item consumed.

15. A method for identifying and tracking food items, comprising:
obtaining a container adapted to hold a food item, wherein the container has an identification tag affixed thereto, said tag having a memory for storing electronically-readable data that identifies a food item;
preparing a food item and placing the food item in the container;
communicating with the tag to store an identification of the food item placed in the container;
placing the container on a conveyor that conveys the container in a loop around a space, wherein a consumer can remove the container from the conveyor and consume the food item while on the premises where the conveyor is located;
using a sensor to electronically read the data stored on the tag of a container that is brought by the conveyor into proximity of the sensor;
receiving the identification of the food item from the sensor; and
displaying the identification of the food item on an electronic display to consumers while the container is in proximity to the display, wherein the electronic display is a stationary display separate from the conveyor, and wherein displaying the identification of the food item comprises electronically scrolling the identification of the food item on the display simultaneously with the container along a length of the display at a rate that matches the movement of the container on the conveyor.

16. The method of claim 15, wherein after a consumer has consumed a food item, reusing the container to provide another food item to another consumer.

17. The method of claim 15, wherein the tag further includes data that uniquely identifies the container within the system, and wherein the method further comprises tracking the consumption of the food item being held by the container.

18. The method of claim 15, wherein the tag further includes data for identifying one or more ingredients of the food item in the container, and wherein the method further comprises receiving and displaying the ingredients along with the identification of the food item.

19. The method of claim 15, wherein the food item is prepared and placed in the container without specific request by a consumer of the food item.

20. The method of claim 15, wherein the tag further includes data for identifying a price of the food item placed in the container.

21. The method of claim 20, further comprising:
providing a portable sensor that can read the electronically-readable data stored on a tag;
using the portable sensor to read the data stored on a tag of a container from which a consumer has consumed the food item; and
calculating a total cost for payment by the consumer of the food item.

22. The method of claim 21, further comprising receiving a plurality of prices from a plurality of containers whose tags have been read by the portable sensor at a location in the premises where the consumer consumed the food items.

23. The method of claim 22, further comprising communicating the plurality of prices to a centralized location in the premises where the consumer can provide payment for the food items consumed.

* * * * *